US011255648B2

(12) United States Patent
O'Shea et al.

(10) Patent No.: US 11,255,648 B2
(45) Date of Patent: Feb. 22, 2022

(54) PROJECTILE WITH A RANGE EXTENDING WING ASSEMBLY

(71) Applicant: MBDA INCORPORATED, Arlington, VA (US)

(72) Inventors: Hank O'Shea, Thousand Oaks, CA (US); Dave Madigan, Thousand Oaks, CA (US); Randy Berberea, Thousand Oaks, CA (US); Mike Hutchings, Newbury Park, CA (US); Peter Zeman, Thousand Oaks, CA (US); Rick Cappo, Leesburg, VA (US); Chuck Ungermann, Westlake Village, CA (US); Lee Johnson, Newbury Park, CA (US)

(73) Assignee: MBDA INCORPORATED, Arlington, VA (US)

( * ) Notice: Subject to any disclaimer, the term of this patent is extended or adjusted under 35 U.S.C. 154(b) by 236 days.

(21) Appl. No.: 16/676,976

(22) Filed: Nov. 7, 2019

(65) Prior Publication Data

US 2020/0149848 A1 May 14, 2020

Related U.S. Application Data

(60) Provisional application No. 62/757,637, filed on Nov. 8, 2018.

(51) Int. Cl.
*F16H 25/22* (2006.01)
*F42B 10/14* (2006.01)
*F42B 10/38* (2006.01)
*F16H 25/20* (2006.01)

(52) U.S. Cl.
CPC ......... *F42B 10/14* (2013.01); *F16H 25/2204* (2013.01); *F42B 10/38* (2013.01); *F16H 2025/2075* (2013.01)

(58) Field of Classification Search
CPC ...... F42B 10/14; F42B 10/38; F16H 25/2204; F16H 2025/2075
See application file for complete search history.

(56) References Cited

U.S. PATENT DOCUMENTS

| | | | |
|---|---|---|---|
| 2004/0200929 A1* | 10/2004 | Perni | F16H 25/205 244/99.11 |
| 2015/0308549 A1* | 10/2015 | Hirai | F16H 25/205 74/89.29 |
| 2016/0121992 A1* | 5/2016 | Saroka | B64C 9/02 244/129.4 |
| 2017/0299355 A1* | 10/2017 | Trouillot | F42B 12/20 |
| 2017/0334542 A1* | 11/2017 | Stanley | B64C 39/024 |
| 2019/0219373 A1* | 7/2019 | Pinoteau | F42B 10/14 |
| 2020/0130809 A1* | 4/2020 | Tsai | F16H 51/00 |
| 2020/0149848 A1* | 5/2020 | O'Shea | F42B 10/18 |
| 2021/0055085 A1* | 2/2021 | Snavely | F42B 10/14 |

(Continued)

*Primary Examiner* — David M Fenstermacher
(74) *Attorney, Agent, or Firm* — Oblon, McClelland, Maier & Neustadt, L.L.P.

(57) ABSTRACT

An elongate cylindrical projectile including processing circuitry, a head assembly, a tail section assembly, a mid body section positioned between the head assembly and tail assembly, and a wing assembly, the wing assembly including a deployable wing which is stored in a closed position entirely within the mid body section and is deployed, using an actuator, to outside the mid body section in an open position in response to a command from the processing circuitry.

19 Claims, 14 Drawing Sheets

(56) References Cited

U.S. PATENT DOCUMENTS

2021/0063127 A1\* 3/2021 Cleveland ............... F42B 10/14
2021/0122463 A1\* 4/2021 Bernard .............. F16H 25/2021
2021/0140748 A1\* 5/2021 Buttolph ................. F42B 10/14
2021/0215244 A1\* 7/2021 Jiang ................... F16H 25/2204

\* cited by examiner

PROJECTILE WITH A RANGE EXTENDING WING ASSEMBLY

CROSS REFERENCE TO RELATED APPLICATION

This application claims the benefit of priority from U.S. Provisional Application No. 62/757,637 filed Nov. 8, 2018, which is incorporated herein by reference in its entirety.

FIELD

The present invention relates to a projectile, such as an artillery round, missile, mortar, and the like, having a deployable wing assembly for increasing the projectile's range.

BRIEF SUMMARY

In an embodiment, an elongate cylindrical projectile comprises processing circuitry, a head assembly, a tail section assembly, a mid body section positioned between the head assembly and tail assembly, and a wing assembly, the wing assembly including a deployable wing which is stored in a closed position entirely within the mid body section and is deployed, using an actuator, to outside the mid body section in an open position in response to a command from the processing circuitry.

In an embodiment, the wing includes a forward wing and an aft wing pivotally attached to the forward wing via a distal pivot.

In an embodiment, a forward end of the forward wing is pivotally attached to a pivot member and an aft end of the aft wing is coupled to a carriage.

In an embodiment, the wing assembly includes a cylindrical threaded rod configured to be rotated via the actuator, rotation of the cylindrical threaded rod in a first direction displaces the carriage linearly along the projectile, and displacement of the carriage causes the wing to be deployed from the closed position to the open position.

In an embodiment, the cylindrical threaded rod is a ball screw and the carriage includes a nut fixed to the carriage to prevent the nut from rotating such that, when the ball screw is rotated, the nut is slid along the ball screw to displace the carriage linearly.

In an embodiment, the actuator is a motor mounted to the pivot member on a side of the pivot member opposite to the carriage, and the pivot member includes a hole through which the cylindrical threaded rod is positioned to communicate with the motor and the carriage.

In an embodiment, the forward end of the forward wing is pivotally attached to the pivot member such that the forward wing does not move linearly with the aft wing.

In an embodiment, the forward wing and the aft wing are each a rectilinear member configured to generate aerodynamic lift.

In an embodiment, when the wing is in the closed position, the forward wing and the aft wing are parallel to each other.

In an embodiment, the mid body includes a slot through which the wing is deployed when the wing is in the open position.

In an embodiment, the projectile is an artillery round, a missile, or a mortar.

In an embodiment, the head assembly includes a warhead and a fuze configured to deliver explosive effects on impact of the projectile.

In an embodiment, the tail section includes one or more fins.

In an embodiment, a method of deploying a wing of a projectile, the projectile including processing circuitry, a head assembly, a tail section assembly, and a mid body section positioned between the head assembly and tail assembly, includes storing the wing in a closed position entirely within the mid body section, and deploying the wing, via an actuator, to outside the mid body section in an open position in response to a command from the processing circuitry.

In an embodiment, the deploying comprises actuating a cylindrical threaded rod, which displaces a carriage linearly along the apparatus, the wing includes a forward wing and an aft wing pivotally connected to the forward wing, and an aft end of the aft wing is coupled to the carriage such that the aft wing moves linearly with the carriage and pivotally displaces the forward wing.

In an embodiment, the cylindrical threaded rod is a ball screw and the carriage includes a nut fixed to the carriage to prevent the nut from rotating such that, when the ball screw is rotated, the nut is slid along the ball screw to displace the carriage linearly.

In an embodiment, a forward end of the forward wing is pivotally attached to a pivot member such that the forward wing does not move linearly with the aft wing.

In an embodiment, the actuator is a motor mounted to the pivot member on a side of the pivot member opposite to the carriage, and the pivot member includes a hole through which the cylindrical threaded rod is positioned to communicate with the motor and the carriage.

In an embodiment, when the wing is in the closed position, the forward wing and the aft wing are parallel to each other.

In an embodiment, the projectile is an artillery round, a missile, or a mortar.

DETAILED DESCRIPTION OF PREFERRED EMBODIMENTS

Disclosed according to the present invention is a projectile 100, such as a military artillery shell, having a wing assembly 200 that increases the projectile's range and/or performance, improving troop safety and mission effectiveness. As will be described below, the wing assembly 200 preferably provides the projectile 100 greater post-apogee range extension after gun launch with or without propulsion during the boost phase, compared to projectiles lacking such a wing assembly. Enhanced range enables troops deploying the projectile 100 to operate at increased distances from their targets, improving their safety.

The wing assembly 200 is preferably a deployable wing assembly adapted to alternate between a stowed—or closed—configuration (FIG. 1), in which the wing assembly 200 is retracted inside the projectile's 100 body, and a deployed—or extended—configuration (FIG. 2), in which the wing assembly 200 extends outward from the projectile 100 and generates additional aerodynamic lift. The deployability allows the projectile 100 to be employed with conventional artillery cannon (e.g., howitzer), while still achieving range and performance improvements.

Figure 1:
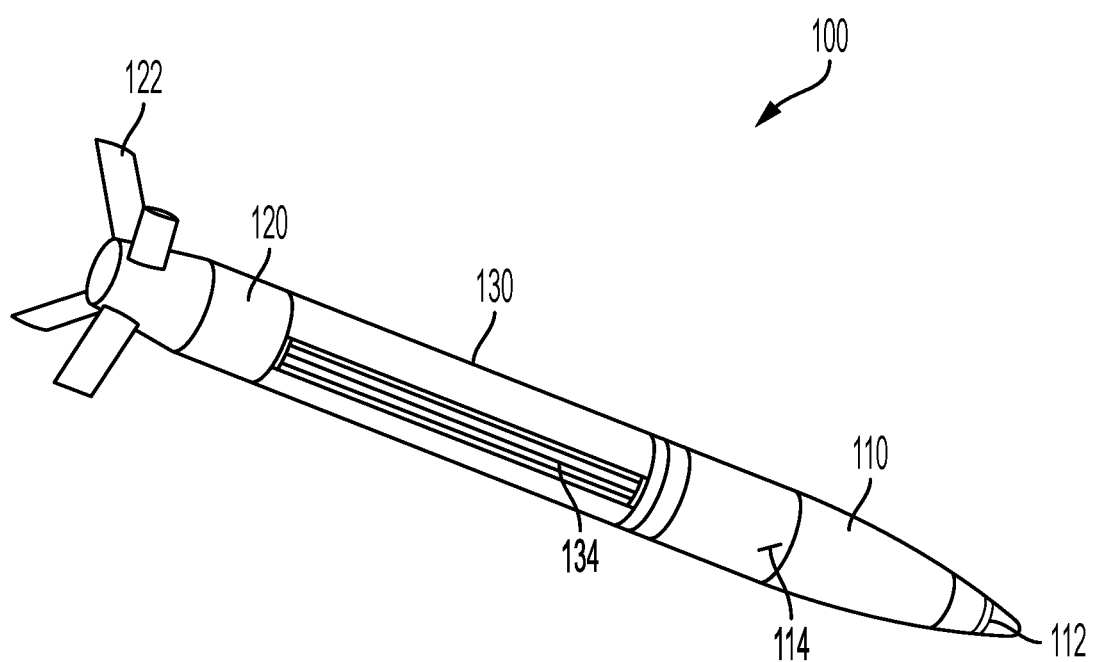
FIG. 1 illustrates an example projectile having a range extending wing assembly, wherein the wing assembly is in a stowed configuration.
Figure 2:
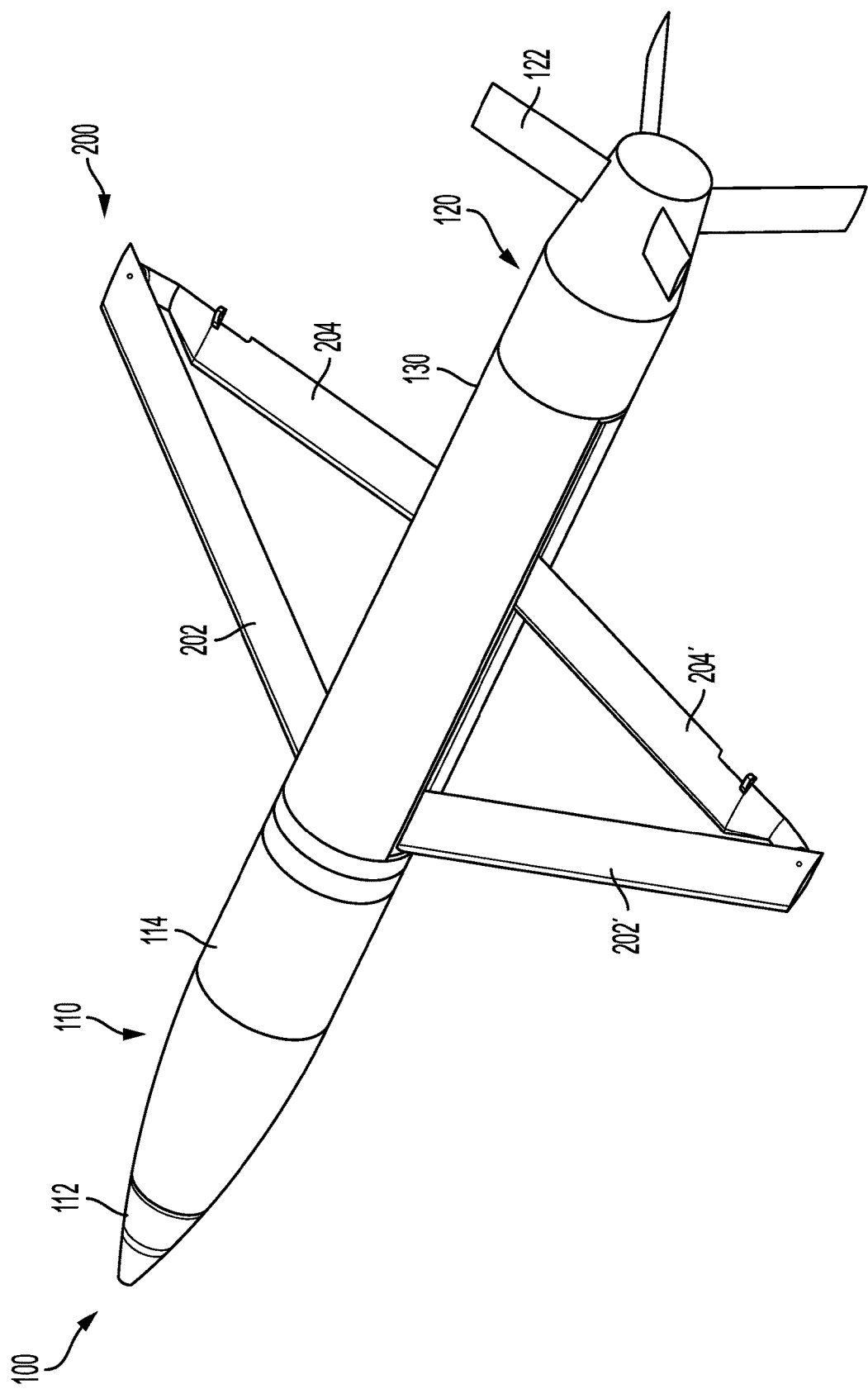
FIG. 2 illustrates the projectile of FIG. 1, wherein the wing assembly is in a deployed configuration.

Turning now to FIGS. 1 and 2, an example projectile 100 of the present invention is an elongate cylindrical body having a warhead assembly 110, a tail section assembly 120, a mid body section 130, and the wing assembly 200. The warhead assembly 110 may include a warhead 114 and a fuze 112, in any desired combination for delivering explosive effects on impact, on delay, etc. The tail section assembly 120 enables directional control of the projectile 100 and may include one or more fins 122 that are controlled by means well known in the art. The mid body section 130 is located between the warhead assembly 110 and the tail section assembly 120, and is preferably where the wing assembly 200 is positioned, as will be described below. The projectile 100 may include additional components as required, such as a flight computer, GPS receiver, inertial measurement unit (IMU), electronic warfare payloads, and the like.

Figure 3:
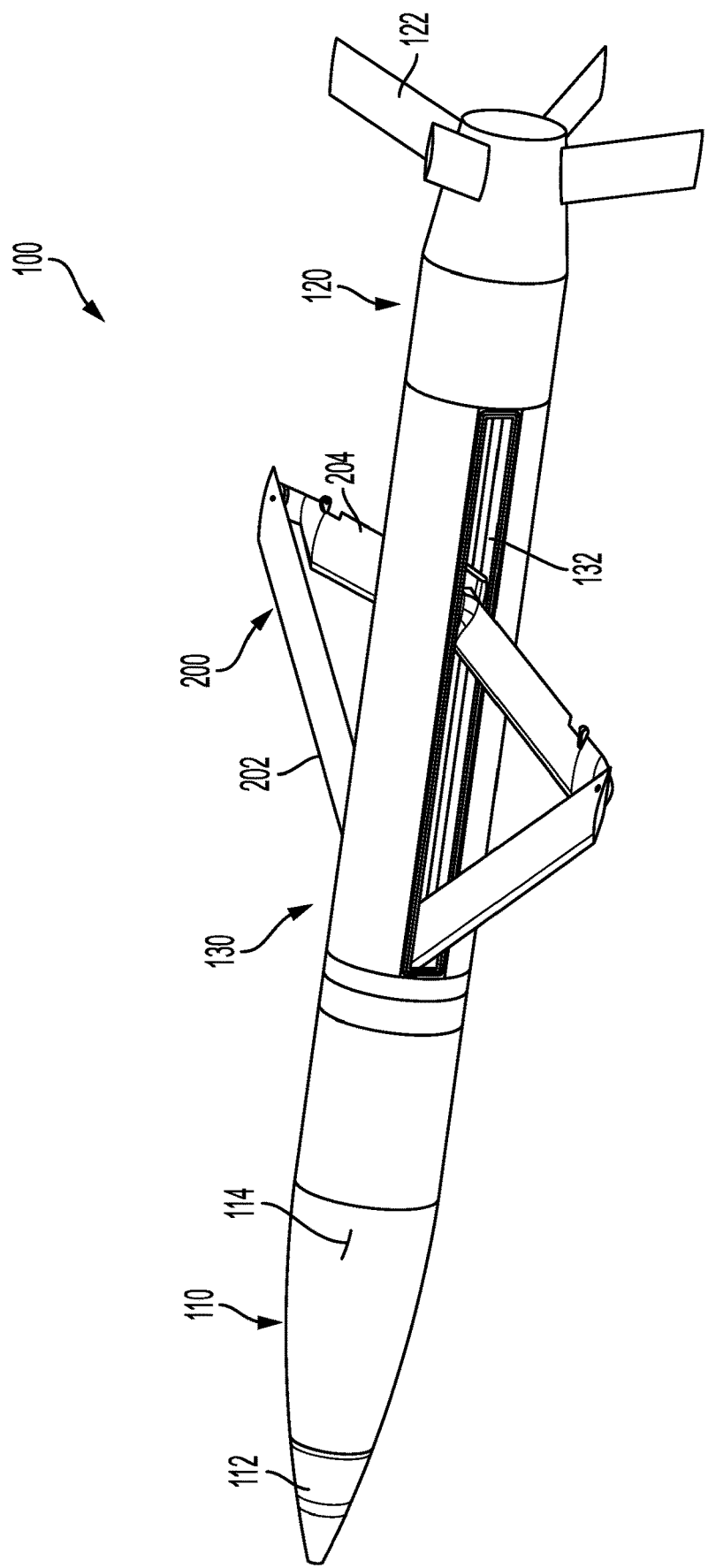
FIG. 3 provides a side view of the projectile and wing assembly of FIG. 1.
Figure 4:
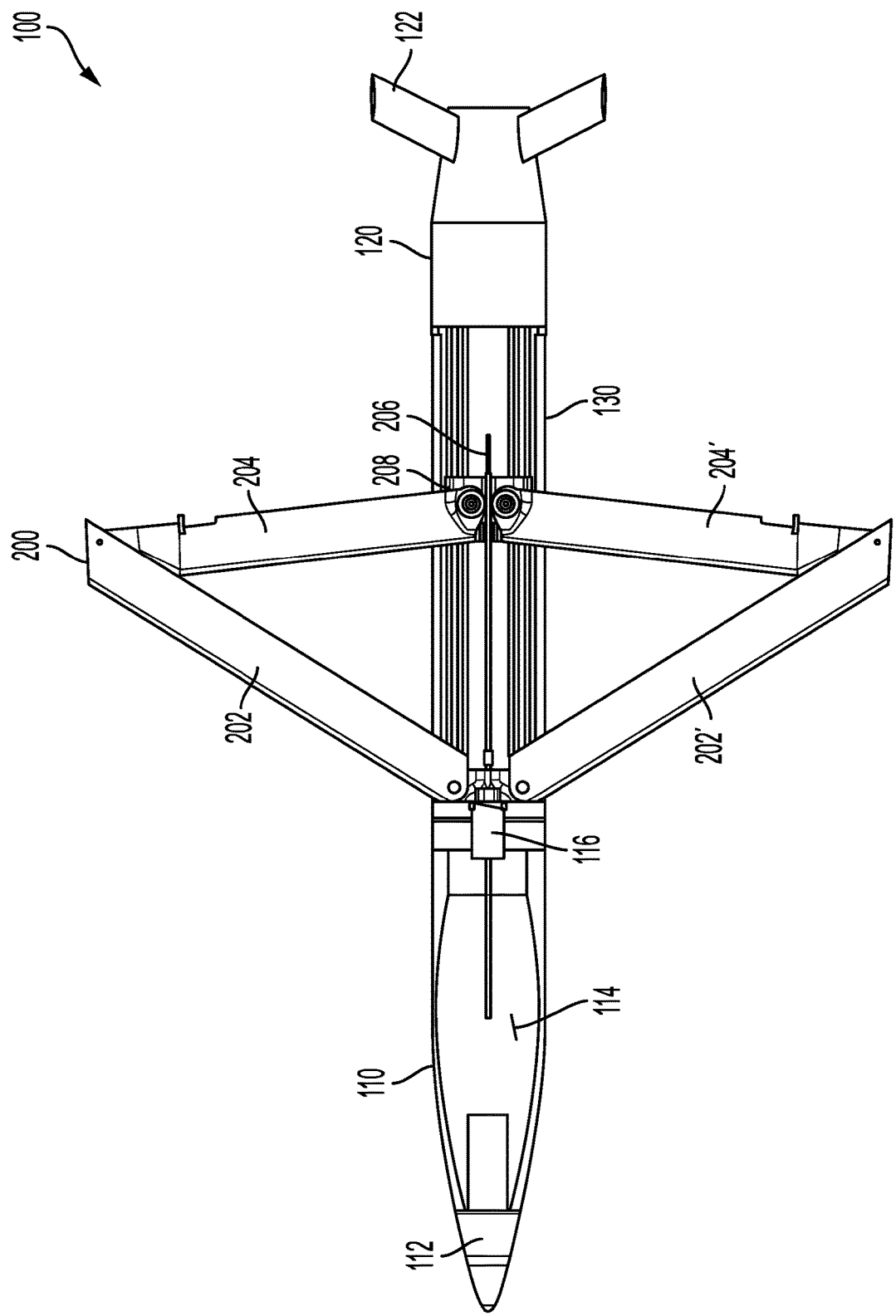
FIG. 4 is a plan view of the projectile of FIG. 1 wherein a top outer shell of the projectile body has been removed to illustrate a preferred wing assembly in more detail.

Turning now to a discussion of the wing assembly 200 and FIGS. 2-4, the wing assembly 200 is a high performance, diamond-shaped joined tandem wing that provides superior aerodynamic, structural, and deployment performance when compared to single panel wings. In a preferred approach, the wing assembly 200 features aspects of the extendable, diamond-shaped wing assembly disclosed in U.S. Pat. No. 5,615,846, the contents of which are hereby incorporated in their entirety.

As best shown in FIG. 4, the wing assembly 200 preferably includes forward wings 202, 202', aft wings 204, 204', an aft wing carriage 208, a ball screw 206, and a deployment mechanism 116, such as a motor, or any suitable electrical, mechanical, pneumatic, or energetic device. In a preferred approach, the wing assembly 200 is generally symmetrical about its midline, with the forward wings more specifically including a right forward wing 202 and a left forward wing 202', and the aft wings including a right aft wing 204 and a left aft wing 204'. The right forward wing 202 and left forward wing 202' are preferably mirrors of each other; the right and left aft wings 204, 204' are similarly configured. Accordingly, it will be appreciated that discussion of a wing, such as forward wing 202, is applicable to both the right forward wing 202 and the left forward wing 202', and the distinction between right and left will be avoided herein for ease of reading.

Figure 5:
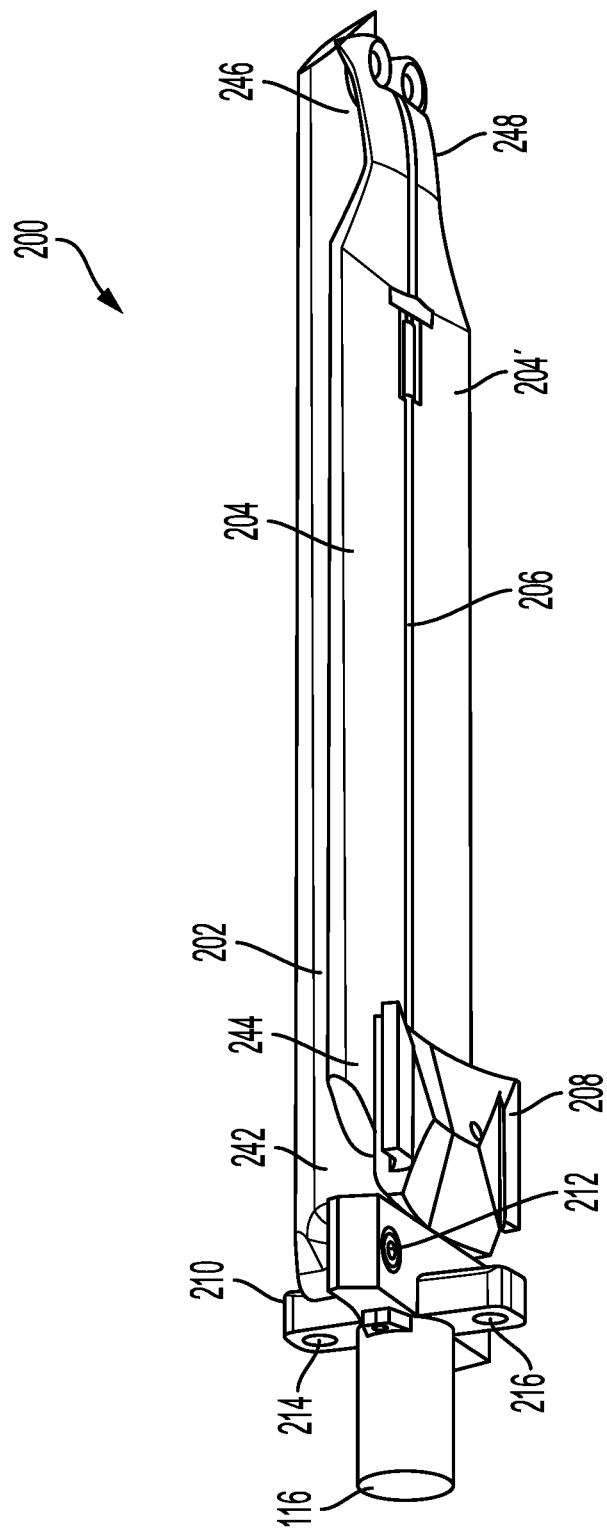
FIG. 5 illustrates an example range extending wing assembly, wherein the wing assembly is in a stowed configuration, and wherein the wing assembly preferably includes a forward wing subassembly and an aft wing subassembly.
Figure 11:
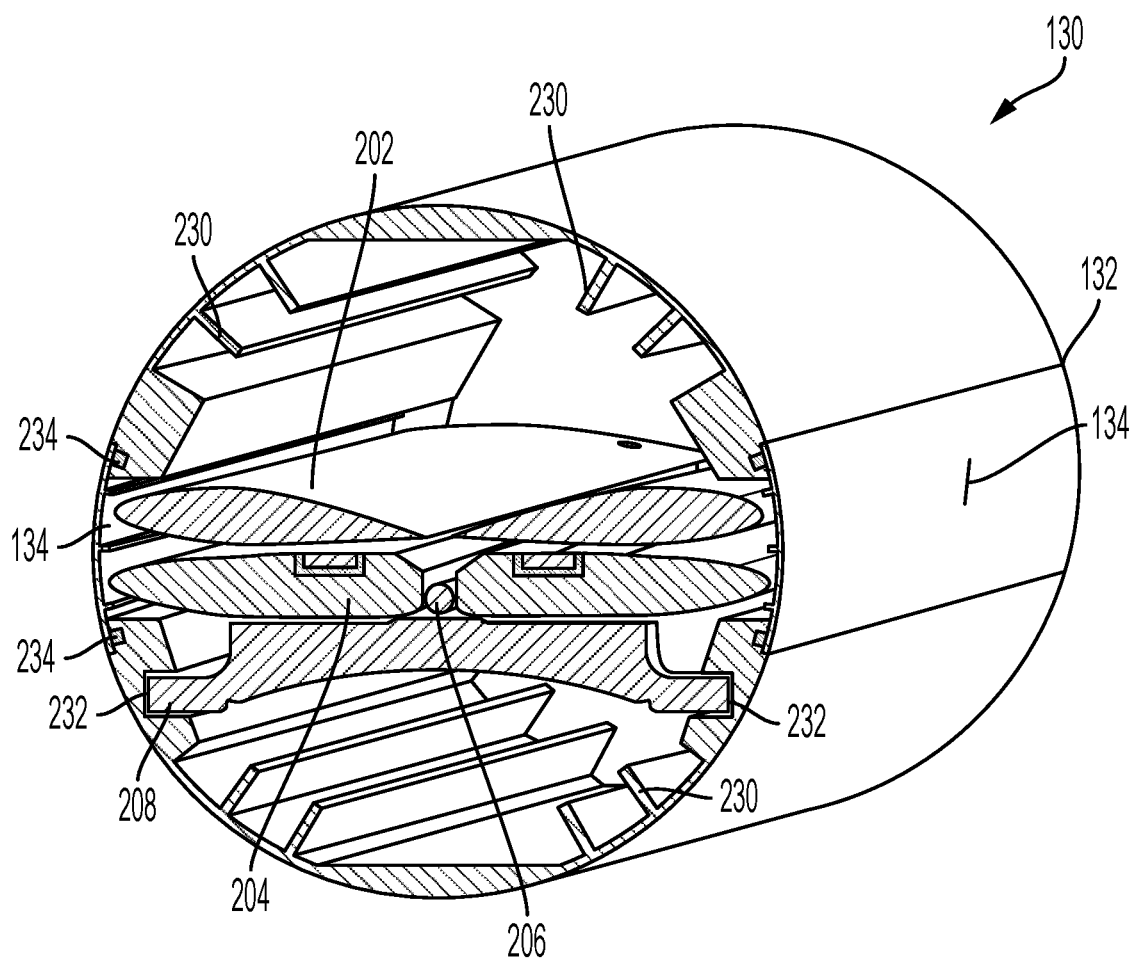
FIG. 11 is a partial cross-sectional view of the projectile and wing assembly of FIG. 10, wherein the wing assembly is in a stowed configuration.

An example illustrating how the wing assembly 200 operates will follow to aid understanding of the wing assembly 200. Before firing, the projectile 100 is loaded into a cannon or similar piece of artillery. At this stage, the wing assembly 200 is in the closed configuration (FIG. 1) and the wings do not extend outward from the standard moldline of the projectile 100. FIGS. 5 and 11 also illustrate the wing assembly 200 in the closed configuration. In this state, the forward wing 202 and aft wing 204 are generally parallel to each other, with the forward wing 202 resting over the aft wing 204, and aligned such that a proximal end 242 of the forward wing 202 sits generally above the proximal end 244 of the aft wing 204, and the distal end 246 of the forward wing 202 sits generally above the distal end 248 of the aft wing 204. Further, the aft wing carriage 208 is slid forward, near the motor 116. The wing assembly 200 remains locked in the closed configuration by the ball screw 206. The cannon then launches the projectile 100. At a desired flight point after launch, such as at apogee, the motor 116 activates and drives the ball screw 206 to rotate. As the ball screw 206 rotates, it drives the aft wing carriage 208 away from the motor 116 and toward the tail section assembly 120. As the aft wing carriage 208 slides rearward, it pulls the aft wing 204 via the pivot joint between the aft wing 204 and the aft wing carriage 208. Since the aft wing 204 and forward wing 202 are connected at their wingtips, both wings 202, 204 start to rotate until the carriage 208 reaches the aft position. At that point, the wings 202, 204 are fully deployed in a diamond-like configuration and preferably lock into position for the remaining time of flight. Although this example was provided, it is to be appreciated that variations on operation are within the scope of this invention. Each wing assembly 200 element will be more fully discussed below.

Figure 6:
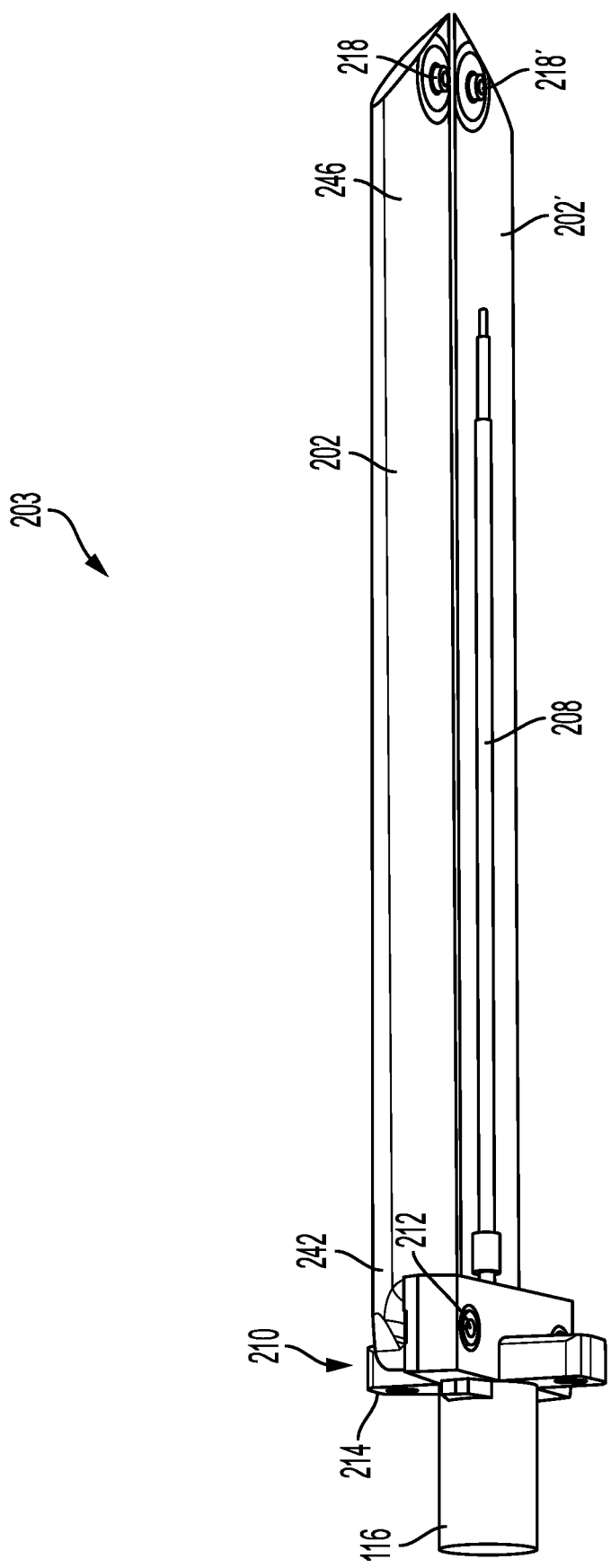
FIG. 6 illustrates an example forward wing subassembly of the wing assembly of FIG. 6.
Figure 10:
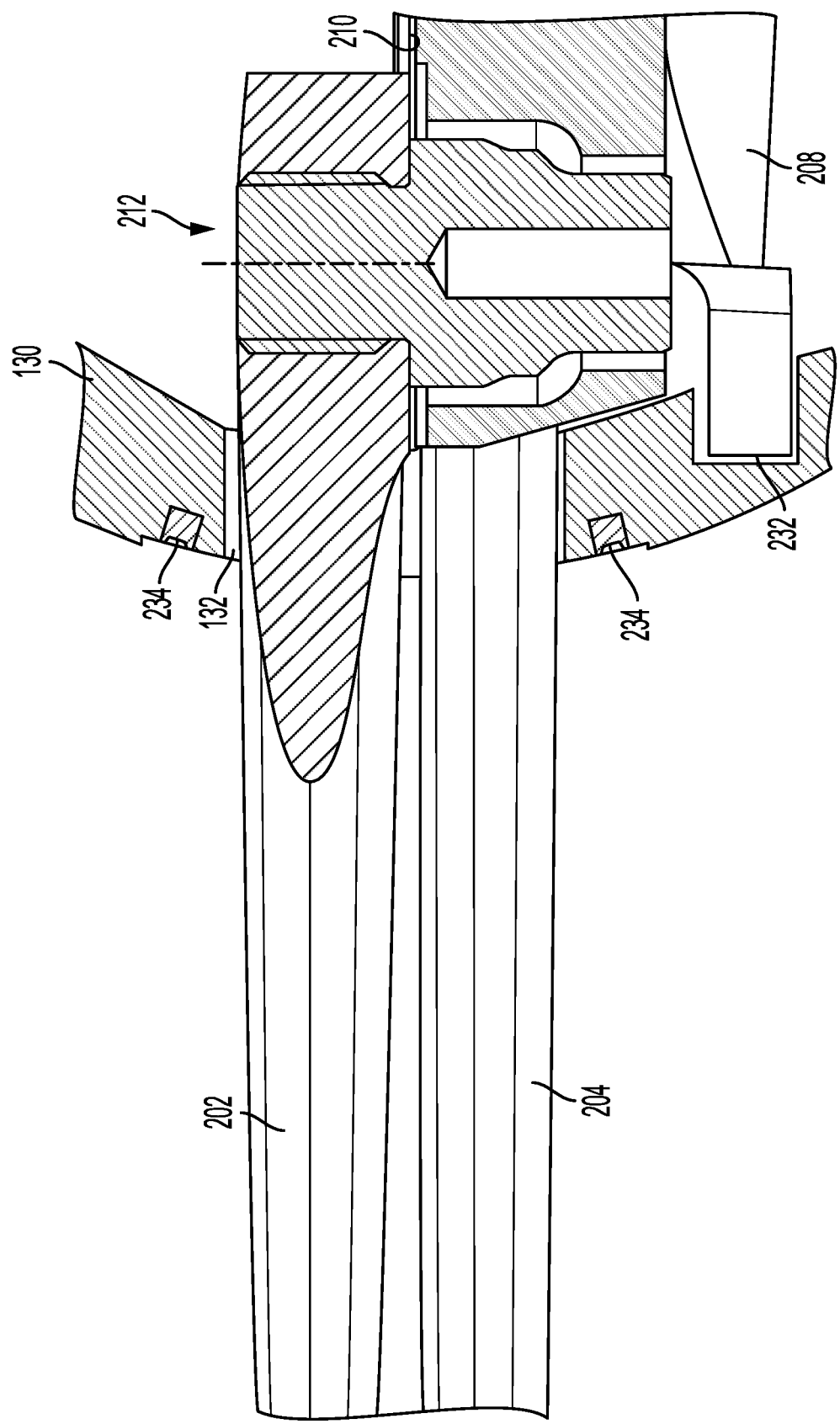
FIG. 10 is an enlarged view of a portion of the projectile and wing assembly of FIG. 10.

Returning to a discussion of the wing elements, the forward wing 202 is preferably a generally rectilinear member adapted to generate aerodynamic lift. It may feature control surfaces or other features that enable directional control of the projectile 100 and be optionally coupled to an onboard computer, datalink or similar mechanism. Turning to FIG. 6, the forward wing 202 includes a forward wing pivot 212 and a distal pivot 218. The forward wing pivot 212 is located at the proximal end 242 and enables the forward wing 202 to pivot about the projectile 100. In a preferred approach, the forward wing pivot 212 is coupled to a pivot member 210, a base-like member adapted to mount to the projectile 100. FIG. 10 provides a cross-sectional view illustrating the forward wing pivot 212 and pivot member 210. The pivot member 210 will be more fully discussed below.

In a preferred approach, the pivot member 210 attaches to the projectile 100 and remains stationary. Because the forward wing 202 is connected to the stationary pivot member 210, the proximal end 242 of the forward wing 202 does not displace longitudinally along the length of the projectile 100, in contrast with the aft wing 204. Notwithstanding the foregoing, it is to be appreciated that the wing assembly 200 can be adjusted to permit the proximal end of the forward wing 202 to displace longitudinally along the projectile 100 in either forward or aft direction, similar to the concept disclosed in U.S. Pat. No. 6,986,481, the contents of which are hereby incorporated in their entirety.

Figure 7:
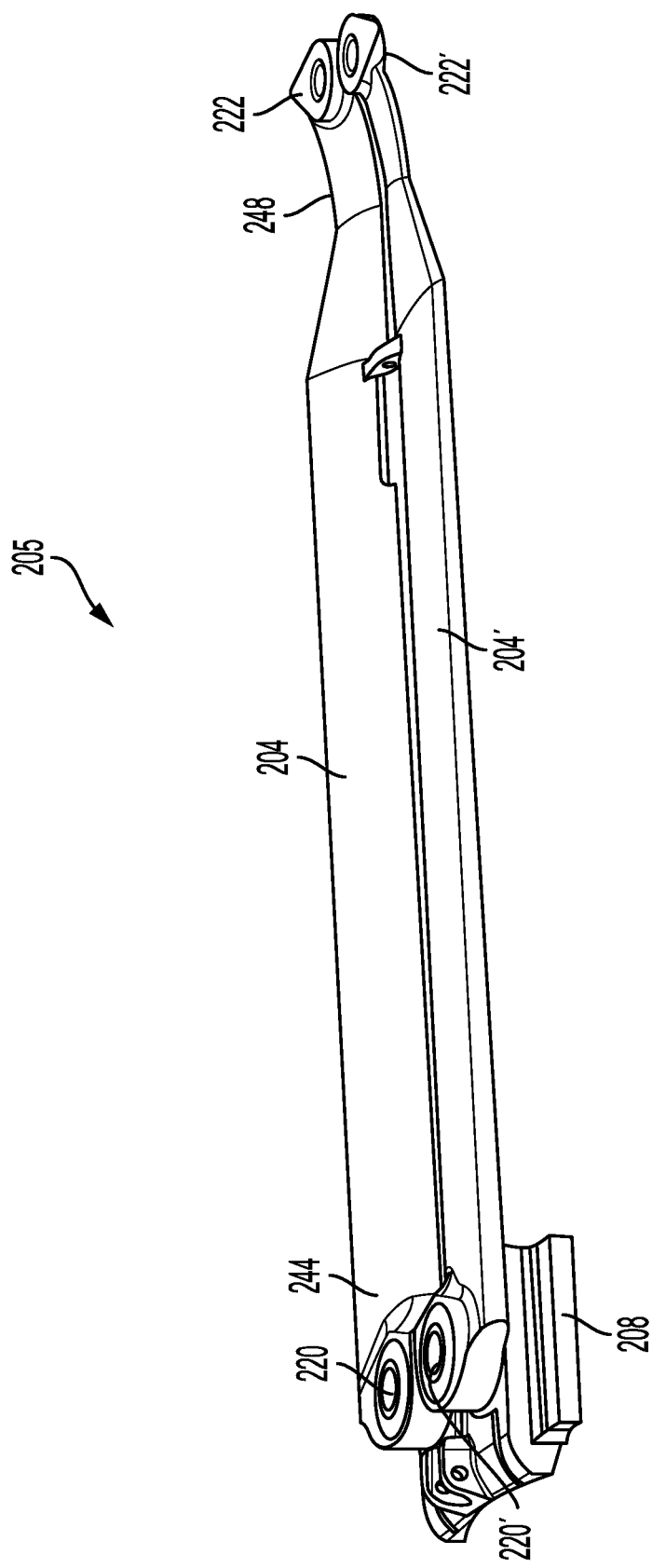
FIG. 7 illustrates an example aft wing subassembly of the wing assembly of FIG. 6.

The forward wing 202 also includes a distal pivot 218 that couples the forward wing 202 to the aft wing 204 and allows the two wings to remain joined together, yet pivot and deploy. As shown in FIG. 7, the aft wing 204 preferably includes a distal pivot joint 222 located at a distal end 248 of the aft wing 204, and which is adapted engage a pivot pin or similar structure on the forward wing 202 distal pivot 218. Thus, deployment of the aft wing 204 (caused by rearward displacement of the carriage 208) causes the forward wing 202 to deploy through the interaction of the forward wing distal pivot 218 and the aft wing distal pivot joint 222.

Turning to the aft wing 204, the aft wing 204 is preferably a generally rectilinear member adapted to generate aerodynamic lift. It may feature control surfaces or other features that enable directional control of the projectile 100 and be optionally coupled to an onboard computer, datalink or similar mechanism. Turning to FIG. 7, the aft wing 204 includes the distal pivot joint 222, as discussed above, and an aft wing carriage joint 220. The aft wing carriage joint 220 couples the aft wing 204 to the carriage 208. Thus, as the carriage 208 slides aft, it both pulls the aft wing 204 rearward and allows the aft wing 204 to pivot about the carriage 208 as the aft wing 204 engages and pulls the forward wing 202.

Figure 14:
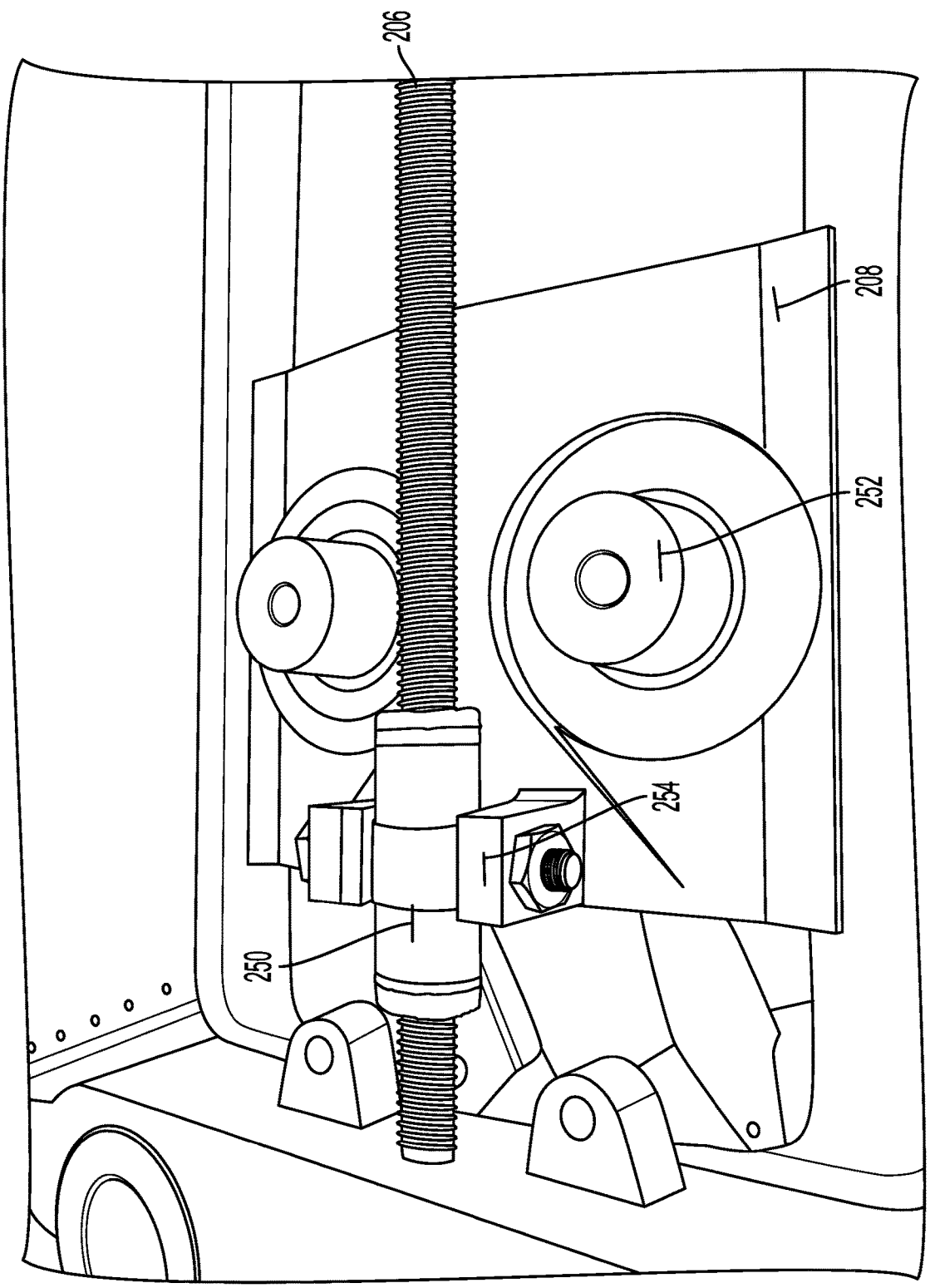
FIG. 14 is an image of an example carriage adapted for actuating the wing assembly.

Turning now to the aft wing carriage 208, the carriage 208 is a principal mechanism for deploying the wing assembly 200. It is a generally flat, plate-like member adapted to slide longitudinally within the projectile 100 and deploy the wing assembly 200 as previously discussed. FIG. 14 illustrates an example carriage 208. As shown, the carriage 208 preferably includes two cylindrical extensions 252 that communicate with the aft wing 204 distal pivot joint 222. The aft wing 204 proximal end 244 includes a cylindrical hole adapted to receive the carriage 208 cylindrical extension 254, and allow the aft wing 204 to pivot about the carriage 208. More aspects of how the carriage 208 fits within the projectile 100 will be discussed below.

Figure 8:
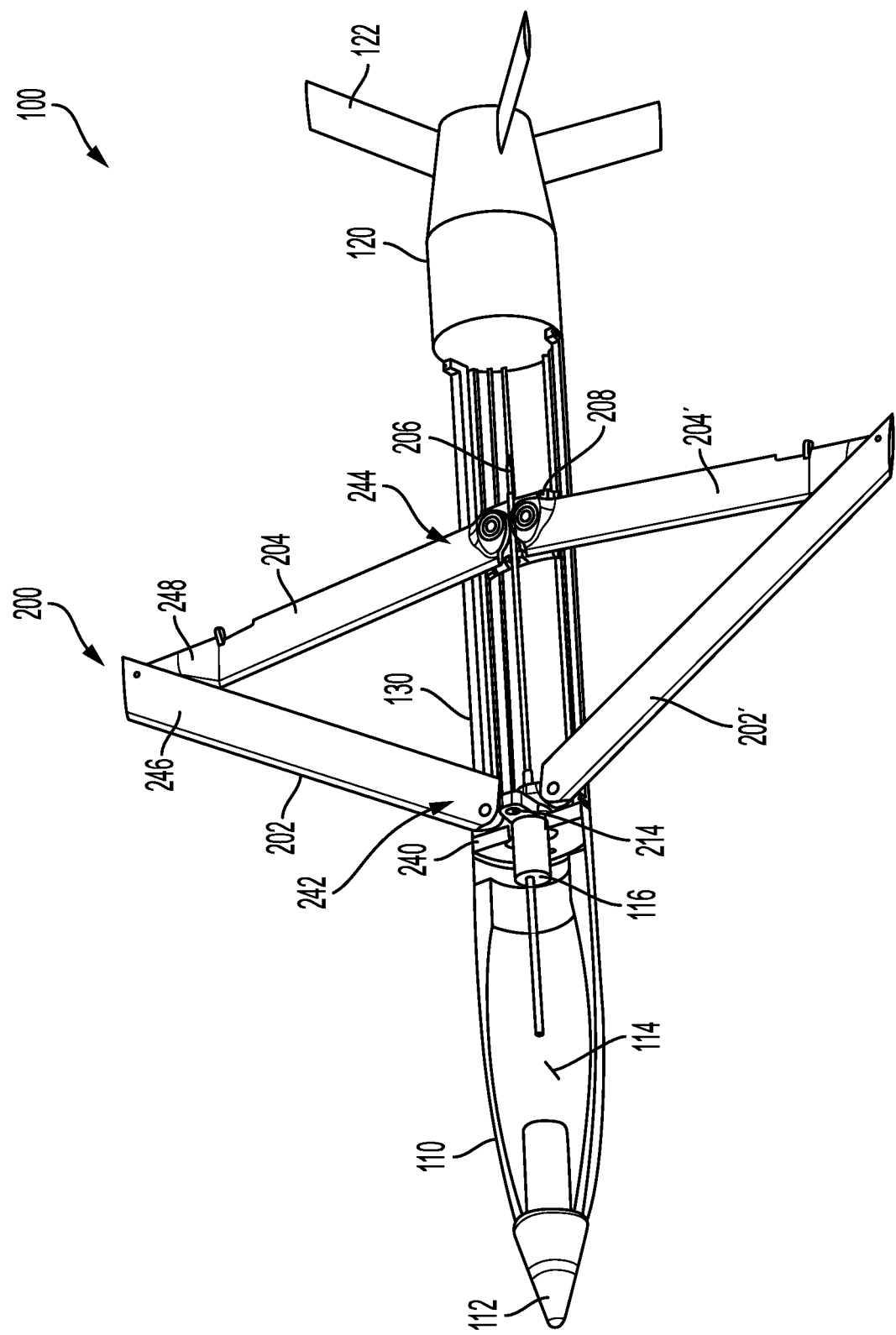
FIG. 8 provides an alternate view of the projectile and wing assembly of FIG. 5.

The carriage 208 is preferably engaged by a ball screw 206. Turning to FIGS. 4 and 8, the ball screw 206 is preferably a cylindrical threaded rod, rotation of which causes longitudinal displacement of the carriage 208. The ball screw 206 may communicate with the carriage 208 in any suitable means for translating ball screw 206 rotation into carriage 208 displacement. In a preferred approach, a ball nut 250 interfaces between the ball screw 206 and the carriage 208. For example and turning to FIG. 14, the ball nut 250 may be a hollow cylinder-like member with internal threading, and adapted to be threaded onto the ball screw 206. In a preferred approach, the ball nut 250 is affixed to the carriage 208 via a mount 254 (including any suitable means, such as a screw, adhesive, welding and the like), which fixes the nut 250 to the carriage 208 and prevents the nut 250 from rotating. Thus, in operation, as the ball screw 206 rotates, it causes the nut 250 to slide along the ball screw 206, thereby pushing the carriage 208 to which the nut 250 is affixed.

Rotation of the ball screw 206 is caused by any suitable mechanism, such as a motor 116 or similar actuator, preferably connected to a suitable source of power. FIG. 4 illustrates a preferred approach in which the ball screw 206 is coupled to an electric motor 116, even more preferably a g-hardened motor, sufficiently mechanically robust for artillery use.

The motor 116 may suitably be mounted to the forward wing pivot member 210, as shown in FIGS. 5-6, through any suitable means, such as a mechanical fastener, adhesive, and the like. In one approach, the motor 116 is mounted to the pivot member 210 on a side of the pivot member 210 opposite the carriage 208. In this approach, the pivot member 210 suitably includes a hole 224 (FIG. 9) through which the ball screw 206 is positioned to communicate with both the motor 116 and the carriage 208.

The motor 116 may be activated by any suitable means. In one approach, the projectile 100 includes an on-board computer or similar processing device that instructs the motor 116 to activate and begin deploying the wing assembly 200. The computer may contain processing circuitry programmed with instructions that instruct the motor 116 to activate upon reaching a predetermined condition, such as altitude, duration of flight, distance to target, GPS coordinates, release of the slot cover 134 (discussed below) and the like. The projectile 100 may suitably include additional sensors that enable the projectile 100 to collect data about the projectile's position (such as, for example, an IMU, GPS, radar and the like) to better inform the wing deployment decision. In addition, the activation can be determined based on balancing or applying different factors in a balancing or thresholding algorithm.

The projectile 100 may also include a data link or similar device that enables the projectile 100 to communicate with an off-board device after the projectile 100 has been launched. The off-board device may be any node that is capable of transmitting information to the projectile, such as an aircraft, a ground-based command and control center, and the like. Such nodes may transmit flight update information that causes the projectile 100 to execute an updated flight plan. In one approach, the data link is coupled to the wing assembly 200 so that the wing assembly 200 operation may be modified after launch. Such modifications may include delaying deployment, causing partial deployment, re-stowing the wing assembly 200 after initial deployment, actuating control surfaces on the wing assembly 200, and the like.

Figure 9:
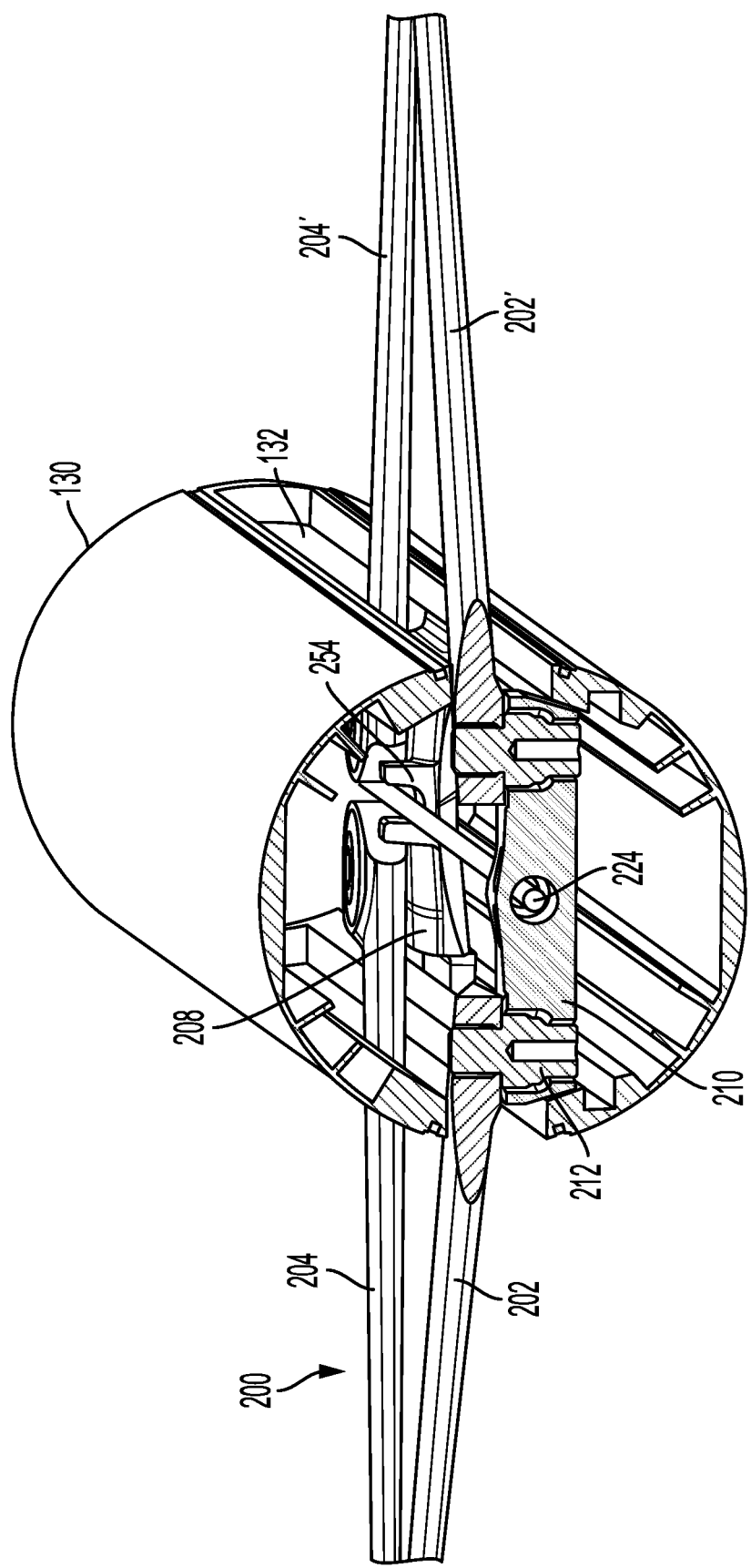
FIG. 9 is a partial cross-sectional view of the example projectile and wing assembly, wherein the wing assembly is in a deployed configuration.
Figure 12:
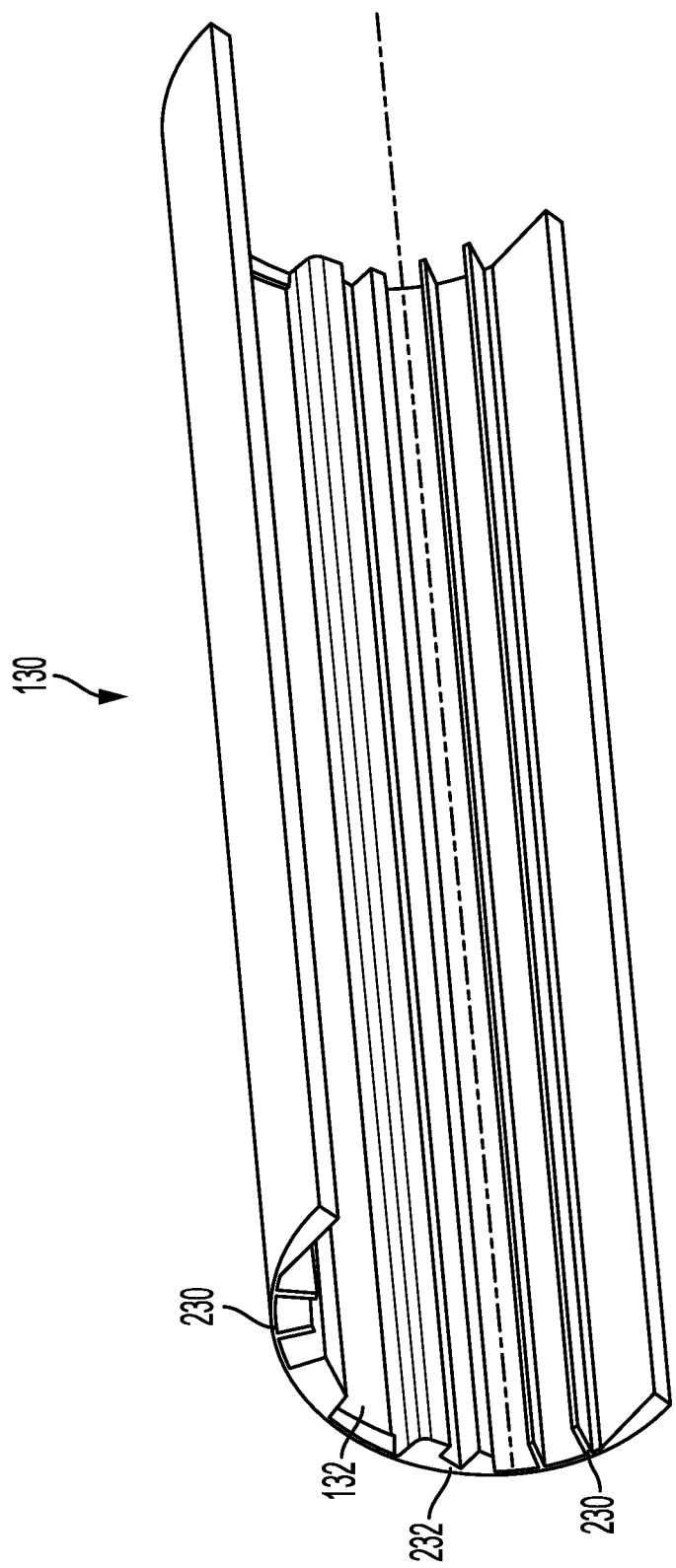
FIG. 12 illustrates a section of an example projectile mid body section of the projectile.
Figure 13:
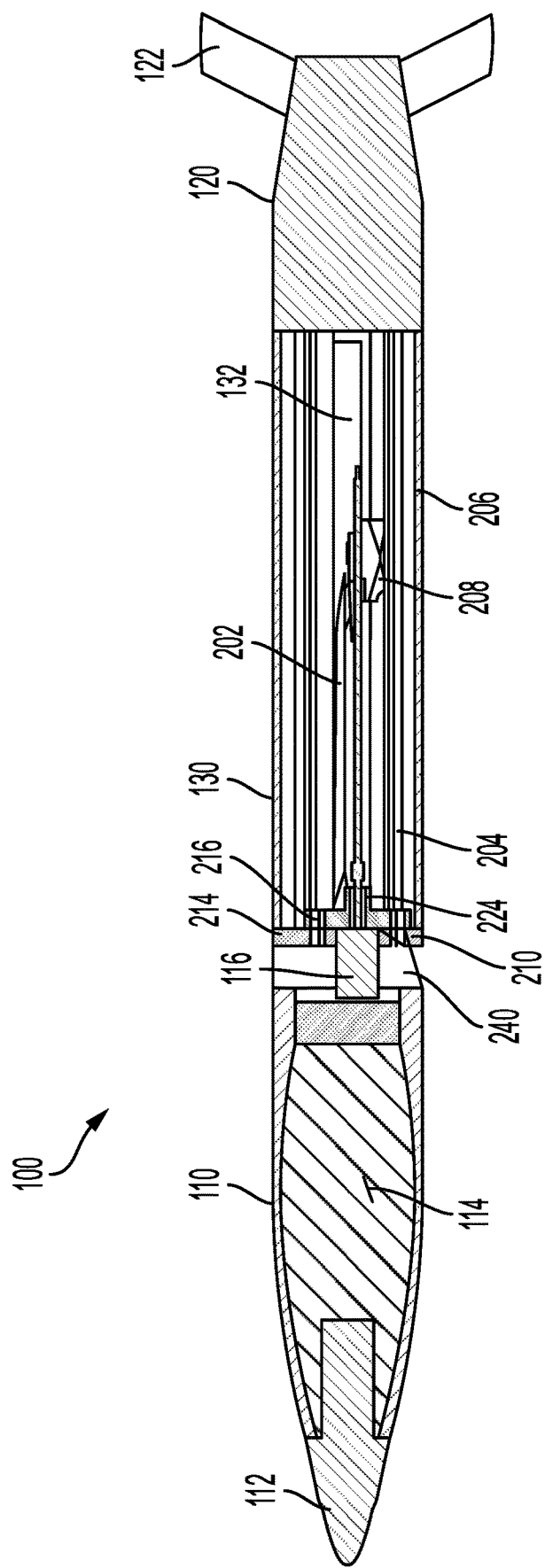
FIG. 13 is a longitudinal cross-sectional view of the projectile and wing assembly.

Returning to the carriage 208, the carriage 208 is preferably adapted to slide longitudinally along the projectile 100 within the mid body section 130 and thereby cause the wing assembly 200 to deploy, as previously discussed. Turning to FIGS. 9 and 11, the mid body section 130 preferably includes one or more rib-like structures 230 that reinforce the structure. The ribs 230 may be configured to also create one or more channels 232 configured to retain the carriage 208 and allow the carriage 208 to slide within the mid body section 130. Such channels 232 preferably extend longitudinally along an inner surface of the mid body section 130 and allow the carriage 208 to freely slide responsive to the ball screw 206. FIG. 12 provides an alternate view of a portion of the mid body section 130 more fully illustrating the ribs 230 and carriage channel 232.

The mid body section 130 may also include slots 132 that allow the wing assembly 200 to deploy from inside the projectile 100. As previously discussed, the wing assembly 200 is in a stowed configuration prior to launch, in which the forward and aft wings 202, 204 are parallel to each other, resting within the projectile 100, thereby enabling the projectile 100 to be loaded into a cannon or similar launcher. The slots 132, configured in any suitable manner, provide openings in the mid body section 130 that allow the forward and aft wings 202, 204 to extend from inside the mid body section 130 and generate aerodynamic lift, as shown in FIGS. 9 and 12.

The slot 132 may also include a releasable slot cover 134, as shown in FIGS. 1 and 11. In a preferred approach, the cover 134 seals the slot 132 and prevents gases and other particulates from entering the projectile 100 during handling and/or launch. As known, the launch process may generate gases that could be harmful to the components within the projectile 100; accordingly, the presence of the cover 134 over the slot 132 prior to launch protects the projectile 100 and its components.

The slot cover 134, if optionally employed, may attach to the slot 132 through any suitable means. In a preferred approach shown in FIGS. 9-11, the mid body section 130 may include a rubber seal and/or one or more grooves 234 that are adapted to hold a flange-like member on an inner face of the slot cover 134, and thereby retain the cover 134 and seal the slots 132. The optional presence of a rubber seal may also aid in preventing gasses from entering the projectile 100.

Various means, such as an explosive pin, may be employed to eject the covers 134 and allow the wing assembly 200 to deploy. In one embodiment, the release of the covers 134 may signal the motor 116 to activate and begin deploying the wing assembly 200. Alternately, the covers 134 may be removed by deployment of the wing assembly 200 itself; for example, as the wing assembly 200 deploys, it generates outward pressure that displaces the covers 134 from the mid body section 130.

The slot cover 134, if optionally employed, may be released from the projectile 100 at any suitable time after launch. In one example, the covers 134 are retained until the projectile 100 reaches flight apogee after firing. The retention of the covers 134 reduces aerodynamic drag during flight. At apogee, the covers 134 are released and the wing assembly 200 deploys.

Turning now to FIGS. 5-8, the wing assembly 200 of the present invention may be produced as a subsystem able to be integrated into an existing projectile 100. FIG. 5 illustrates the wing assembly 200 as a subsystem consisting of the forward wing 202 pivotably coupled to the pivot member 210, the aft wing 204 pivotably coupled to both the carriage 208 and forward wing 202, and the motor 116. This subsystem may be directly mounted to the projectile 100; for example, FIG. 8 illustrates a mounting member 214 on the pivot member 210 that suitably includes one or more holes for a mechanical fastener to affix the pivot member 210 to a projectile 100 bulkhead 240. Any suitable mechanism may be used to install the wing assembly 200 in the projectile 100.

Additional modifications may be made to the wing assembly 200 as mission needs dictate. For example, the wings 202, 204 may be constructed of a material and/or coated with a material that reduces the radar return generated by the wings and increases stealth. In another example, the position of the wings 202, 204 may be variable throughout flight. The wing assembly 200 may deploy and remain locked in the deployed position, fully deploy then partially retract, fully deploy then fully retract, or any other suitable configuration and deployment/retracting pattern. Such variability may be achieved through an onboard processor, data link, or other means as described above, and increase the survivability of the projectile 100 against enemy defenses.

The wing assembly 200 and/or projectile 100 may include an additional payload. The configuration of the wing assembly 200 leaves unoccupied space in the projectile 100, especially within its mid body section 130. Additional systems and/or payloads, such as electronic warfare-related payloads, additional sensors, and the like could be integrated with the projectile 100 and/or wing assembly 200 and expand the capabilities of the projectile 100.

The wing assembly 200 has been shown as housed within the projectile mid body section 130, however, it is to be appreciated that the wing assembly 200 can be located in any suitable location within and/or on the projectile 100. For example, the assembly 200 could be located in the tail section assembly 120 or the warhead assembly 110, wherever a desired aspect of aerodynamic performance can be achieved. Further, the wing assembly 200 need not be constrained to a particular section of the projectile 100, and be able to move along the entire length of the projectile 100 as different flight profiles, missions and aerodynamic considerations dictate, similar to the concept disclosed in U.S. Pat. No. 8,809,755, the contents of which are hereby incorporated in their entirety.

It is to be appreciated that the wing assembly 200 of the present invention can be employed in connection with any suitable type of projectile, including artillery shells, guided artillery shells, missiles, bombs, rockets, aircraft, other aerostructures, and the like, as well as any launching mechanism, such as conventional artillery cannons, vehicle-mounted launchers, maritime launchers, aircraft launchers and the like.

While there have been described what are at present considered to be certain embodiments of the invention, it will be understood that various modifications may be made thereto, and it is intended that the disclosure cover all such modifications as fall within the true spirit and scope of the invention.

What is claimed:

1. An elongate cylindrical projectile, comprising:
   processing circuitry;
   a head assembly;
   a tail section assembly;
   a mid body section positioned between the head assembly and tail assembly; and
   a wing assembly, the wing assembly including a deployable wing which is stored in a closed position entirely within the mid body section and is deployed, using an actuator, to outside the mid body section in an open position in response to a command from the processing circuitry,
   wherein the wing includes a forward wing pivotally attached at a proximal end, and an aft wing pivotally attached at a proximal end, wingtips of the forward wing and the aft wing are attached at a distal pivot, and the proximal ends of the forward wing and aft wing are within the mid body section in the open position.

2. The projectile of claim 1, wherein the proximal end of the forward wing is pivotally attached to a pivot member and the proximal end of the aft wing is coupled to a carriage that is displaced along a longitudinal axis of the projectile to deploy the wing from the closed position to the open position.

3. The projectile of claim 2, wherein the wing assembly includes a cylindrical threaded rod configured to be rotated via the actuator, rotation of the cylindrical threaded rod in a first direction displaces the carriage linearly along the projectile, and displacement of the carriage causes the wing to be deployed from the closed position to the open position.

4. The projectile of claim 3, wherein the cylindrical threaded rod is a ball screw and the carriage includes a nut fixed to the carriage to prevent the nut from rotating such that, when the ball screw is rotated, the nut is slid along the ball screw to displace the carriage linearly.

5. The projectile of claim 3, wherein the actuator is a motor mounted to the pivot member on a side of the pivot member opposite to the carriage, and the pivot member includes a hole through which the cylindrical threaded rod is positioned to communicate with the motor and the carriage.

6. The projectile of claim 3, wherein the proximal end of the forward wing is pivotally attached to the pivot member such that the forward wing does not move linearly with the aft wing.

7. The projectile of claim 1, wherein the forward wing and the aft wing are each a rectilinear member configured to generate aerodynamic lift.

8. The projectile of claim 1, wherein, when the wing is in the closed position, the forward wing and the aft wing are parallel to each other.

9. The projectile of claim 1, wherein the mid body includes a slot through which the wing is deployed when the wing is in the open position.

10. The projectile of claim 1, wherein the projectile is an artillery round, a missile, or a mortar.

11. The projectile of claim 1, wherein the head assembly includes a warhead and a fuze configured to deliver explosive effects on impact of the projectile.

12. The projectile of claim 1, wherein the tail section includes one or more fins.

13. A method of deploying a wing of a projectile, the projectile comprising processing circuitry, a head assembly, a tail section assembly, and a mid body section positioned between the head assembly and tail assembly, the method comprising:

storing the wing in a closed position entirely within the mid body section, the wing including a forward wing pivotally attached at a proximal end, and an aft wing pivotally attached at a proximal end, wingtips of the forward wing and the aft wing are attached at a distal pivot, the proximal ends of the forward wing and aft wing are within the mid body section in the open position, and deploying the wing, via an actuator, to outside the mid body section in an open position in response to a command from the processing circuitry.

14. The method of claim 13, wherein the deploying comprises actuating a cylindrical threaded rod, which displaces a carriage linearly along a longitudinal axis of the projectile to deploy the wing from the closed position to the open position, and the proximal end of the aft wing is coupled to the carriage such that the aft wing moves linearly with the carriage and pivotally displaces the forward wing.

15. The method of claim 14, wherein the cylindrical threaded rod is a ball screw and the carriage includes a nut fixed to the carriage to prevent the nut from rotating such that, when the ball screw is rotated, the nut is slid along the ball screw to displace the carriage linearly.

16. The method of claim 14, wherein the proximal end of the forward wing is pivotally attached to a pivot member such that the forward wing does not move linearly with the aft wing.

17. The method of claim 16, wherein the actuator is a motor mounted to the pivot member on a side of the pivot member opposite to the carriage, and the pivot member includes a hole through which the cylindrical threaded rod is positioned to communicate with the motor and the carriage.

18. The method of claim 13, wherein, when the wing is in the closed position, the forward wing and the aft wing are parallel to each other.

19. The method of claim 13, wherein the projectile is an artillery round, a missile, or a mortar.

* * * * *